United States Patent [19]
Itoh et al.

[11] Patent Number: 5,614,314
[45] Date of Patent: Mar. 25, 1997

[54] MAGNETIC RECORDING MEDIUM HAVING AN ENHANCED DIAMOND BONDING RATIO AND A METHOD FOR THE MANUFACTURE THEREOF

[75] Inventors: Yoshiaki Itoh, Matsumoto; Michio Osawa, Yokosuka; Youichi Tei, Matsumoto; Yoshiharu Kashiwakura, Matsumoto; Michinori Nishimura, Matsumoto; Kazuo Nimura, Matsumoto, all of Japan

[73] Assignee: Fuji Electric Co., Ltd., Kawasaki, Japan

[21] Appl. No.: 142,862

[22] Filed: Oct. 28, 1993

[30] Foreign Application Priority Data

Oct. 28, 1992 [JP] Japan .................................. 4-289167
Nov. 30, 1992 [JP] Japan .................................. 4-319804

[51] Int. Cl.$^6$ .............................. G11B 5/66; B32B 5/16; C23C 14/00
[52] U.S. Cl. ..................... 428/332; 428/336; 428/408; 428/694 T; 428/694 TP; 428/694 TC; 428/694 TZ; 428/694 TF; 428/694 TR; 428/695; 428/900; 204/192.2
[58] Field of Search ................ 428/694 T, 694 TP, 428/694 TC, 694 TZ, 694 TF, 900, 695, 336, 332, 408, 694 TR; 204/192.2

[56] References Cited

U.S. PATENT DOCUMENTS

| | | | |
|---|---|---|---|
| 4,717,622 | 1/1988 | Kurokawa | 428/408 |
| 4,767,517 | 8/1988 | Hiraki | 204/192.25 |
| 4,780,354 | 10/1988 | Nakayama | 428/141 |
| 4,804,590 | 2/1989 | Nakayama | 428/408 |
| 4,932,331 | 6/1990 | Kurihara | 106/286.1 |
| 5,045,165 | 9/1991 | Yamashita | 204/192.16 |
| 5,227,211 | 7/1993 | Eltoukhy | 428/65.4 |
| 5,266,409 | 11/1993 | Schmidt | 428/446 |

OTHER PUBLICATIONS

Patent Abstracts of Japan, vol. 16, No. 404 (P–1410), Aug. 26, 1992 & JP-A-04 134 623 (SNYO Electric Co Ltd) May 8, 1992.
Patent Abstracts of Japan, vol. 12, No. 112 (P–687), Apr. 9, 1988 & JP-A-62 241 124 (Matsushita Electric Ind Co) Oct. 21, 1987.
Database WPI, Week 9237, Derwent Publications Ltd., London, GB; AN 92–305306 & JP-A-4 212 715 (Fuji Electric Mfg Co) Aug. 4, 1992.
1990 Digests of Intermag '90, International Magnetics Conference, Apr. Metropole Hotel Brighton, UK Part HA–07, Yassin Mehmandoust et al.: "Hydrogenated Amorphous Carbon (a–C:H) Overcoat for Thin–Film Magnetic Rigid––Disk Application".

*Primary Examiner*—Leszek Kiliman
*Attorney, Agent, or Firm*—Morrison Law Firm

[57] ABSTRACT

A magnetic recording medium and a method for the manufacture thereof are disclosed that are less likely to result in head crushing even if high-hardness slider materials are used, and which is formed with a carbon protective layer that has good anti-CSS characteristics. The carbon protective layer is formed using a sputtering gas mixed with methane at a greater amount than predetermined to form a carbon protective layer in which diamond bonds are present at a higher ratio than graphite bonds, and polymeric bonds are present to an adequate degree. A magnetic recording medium having such a carbon protective layer shows a very high durability in a CSS cycle test.

8 Claims, 9 Drawing Sheets

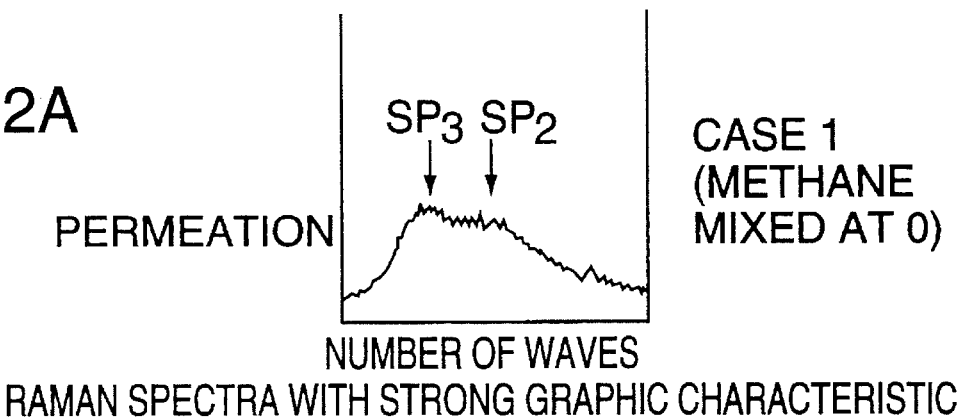
FIG. 2A  CASE 1 (METHANE MIXED AT 0)
RAMAN SPECTRA WITH STRONG GRAPHIC CHARACTERISTIC
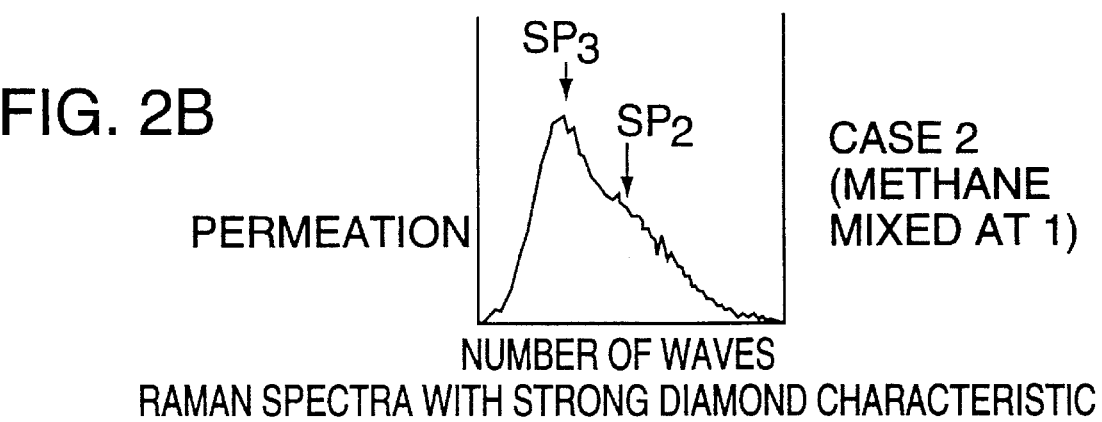
FIG. 2B  CASE 2 (METHANE MIXED AT 1)
RAMAN SPECTRA WITH STRONG DIAMOND CHARACTERISTIC
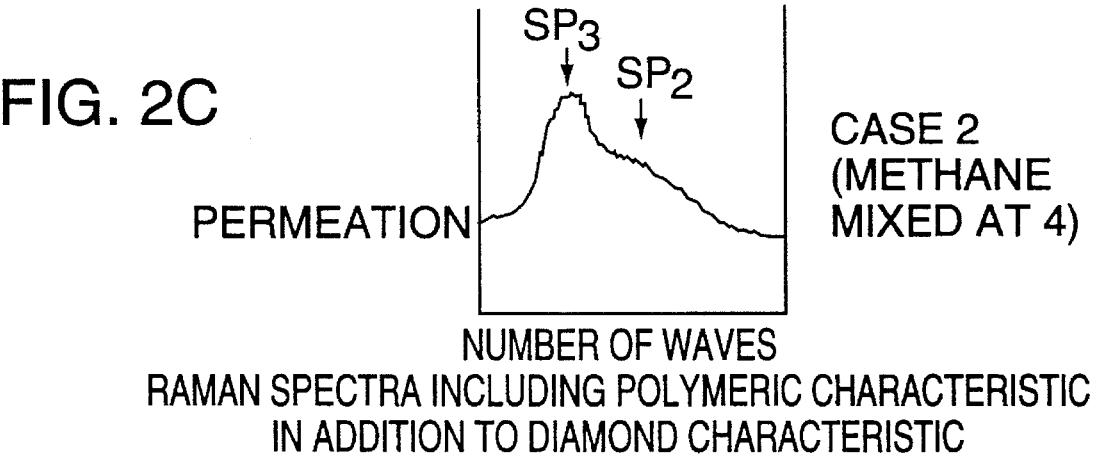
FIG. 2C  CASE 2 (METHANE MIXED AT 4)
RAMAN SPECTRA INCLUDING POLYMERIC CHARACTERISTIC IN ADDITION TO DIAMOND CHARACTERISTIC

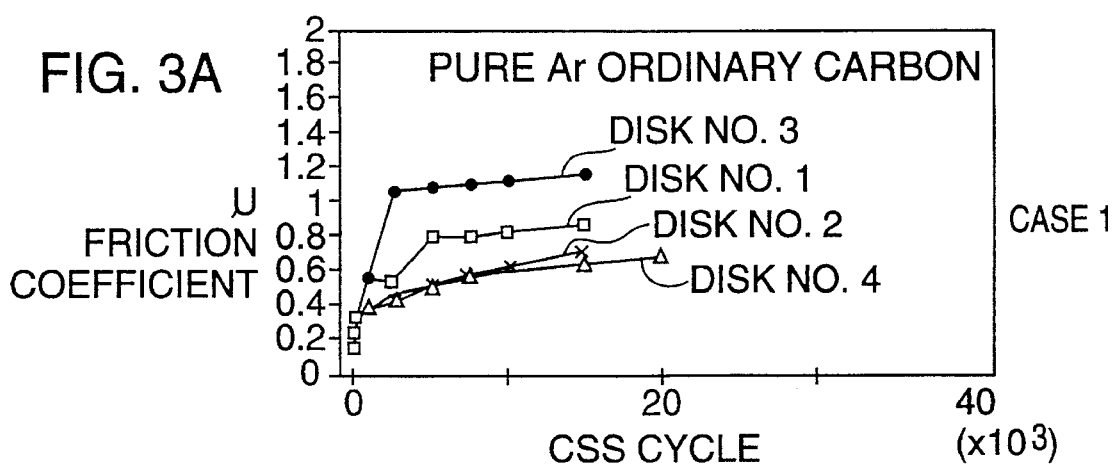
FIG. 3A  CASE 1
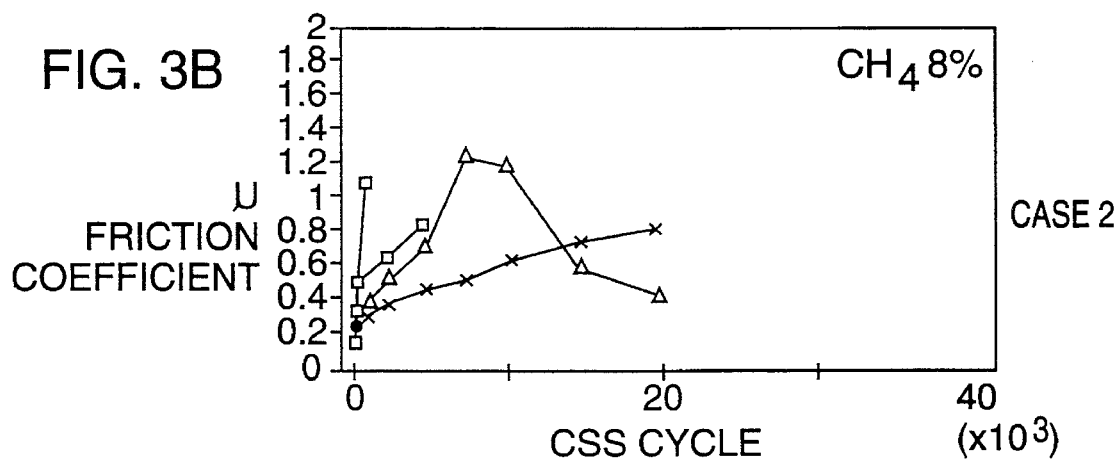
FIG. 3B  CASE 2
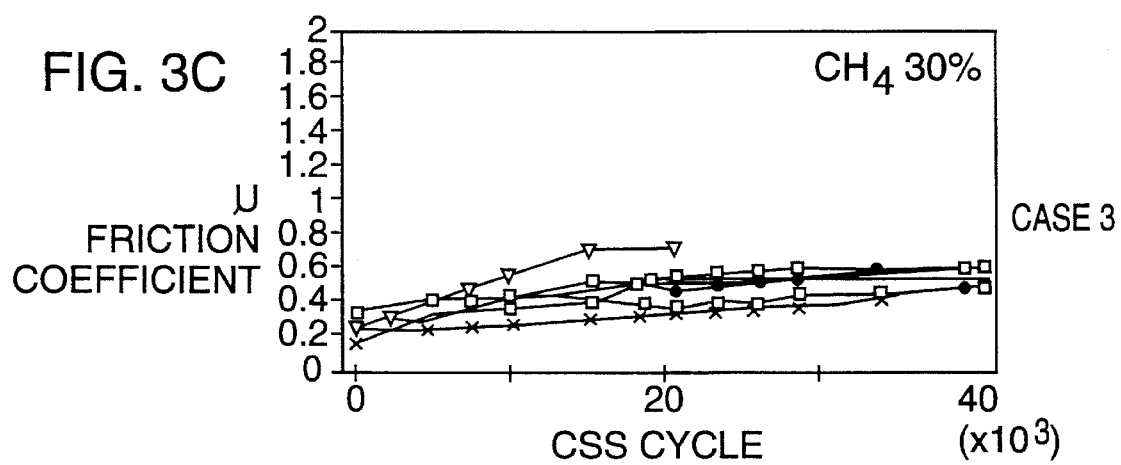
FIG. 3C  CASE 3

MAGNETIC RECORDING MEDIUM HAVING AN ENHANCED DIAMOND BONDING RATIO AND A METHOD FOR THE MANUFACTURE THEREOF

FIELD OF THE INVENTION

The present invention relates to the configuration of a magnetic recording medium such as a magnetic disk used in the hard disk drives of computers, and more particularly a protective layer formed to protect the magnetic layer of the magnetic recording medium.

BACKGROUND

A fixed magnetic disk drive has often been used recently as an external recording device for information processing machines such as computers. FIG. 9 shows the basic configuration of a fixed magnetic disk drive, including a non-magnetic metal layer 12 formed on a non-magnetic substrate 11 as a non-magnetic base substance 1, and a non-magnetic metal base layer 2 that is laminated on the base substance 1. A magnetic layer 3 made of cobalt—chromium—tantalum (Co—Cr—Ta) or cobalt—chromium—platinum (Co—Cr—Pt), being a ferromagnetic alloy, is laminated in thin film form on the metal base layer 2, and thereafter an amorphous carbon protective layer 4 is formed on this magnetic layer 3.

Then, a lubrication layer 5 composed of a liquid lubricant is disposed as required on the protective layer 4 to form the magnetic disk.

As the non-magnetic base substance 1, for example, a substance formed with an Ni—P plated layer 12 using an electroless deposition process on a non-magnetic substrate 11 made of Al—Mg alloy, an alumite base substance, a glass base substance, or a ceramic substance, is used. This base substance is ground down as required, or may be formed with irregularities using textures. While this non-magnetic base substance 1 is heated to a temperature of about 200° C., the non-magnetic metal base layer 2 made of Cr, the magnetic layer 3 made of Co—Cr—Ta, and the protective layer 4 made of amorphous carbon are sequentially laminated using a sputtering process in an argon atmosphere. Then a fluorocarbon-based liquid lubricant is coated on the protective layer 4 to form the lubrication layer 5, thereby creating a magnetic disk.

When such a magnetic disk is mounted on a hard disk drive, the disk repeatedly contacts the recording head disposed on this device. When the hard disk drive is shut down, the head is in contact with the surface of the magnetic disk. Meanwhile, when the drive is operating, the head is levitated slightly from the magnetic disk surface, when information is either read or written, and the system adopted is referred to as the contact-start-stop (CSS) system. Therefore, because it is a CSS system, great impact may occur momentarily between protrusions on the head and the magnetic disk surfaces when the power supply is turned on and off, or because of the seeking motion of the head. To protect the magnetic layer from such mechanical shocks, a protective layer is formed on the surface of the magnetic layer, and depending upon the particular, or usage of the disk, a liquid lubricant film is also formed. Generally, in the case of disks with diameters smaller than 5 inches, carbon is used as the material for the protective layer, which is formed using a sputtering process in an argon atmosphere. As a substitute, oxides, such as for example zirconia oxide, can also be used. One of the reasons that carbon has been adopted as the protective layer material is that the amorphous carbon layer formed using a sputtering process has a relatively strong graphite constitution, a characteristic peculiar to graphite, which therefore exhibits a low friction coefficient under an atmosphere containing much moisture.

Such a carbon protective layer has sufficient wear resistance against conventional MnZn ferrite heads (with a Vickers hardness of about 650), and also exhibits good anti-CSS characteristics. However, when compared with hard ceramic materials such as $Al_2O_3$. TiC and $CaTiO_3$ which are used as the slider materials for thin-film heads or MIG heads (with a Vickers hardness of about 2000) that have recently been adopted in fixed magnetic disk drives, such a carbon protective layer as described above is apt to wear down, and depending on the case, it may crush the head. On the other hand, when an oxide-based protective layer with a high degree of hardness is used, it does not wear down so easily, although this raises a problem in that the layer is too hard, and has an excessively high friction coefficient. That is, a momentary head touch with a high energy that occurs during the levitation associated with a seeking motion or a CSS operation due to foreign materials or protrusions on the disk surface can cause the head to be instantaneously crushed. In recent years, a method has been proposed in which a diamond-like carbon film, which has a high hardness diamond constitution and a higher diamond bonding ratio than that of the graphite bonding, is formed on a magnetic layer as a protective layer. This diamond-like carbon film has, in addition to the carbon's excellent sliding characteristics, a high hardness because it is a diamond structure, and therefore, its anti-wear characteristic with respect to a high-hardness $Al_2O_3$. TiC slider or $CaTiO_3$ slider is superior. Several ideas in this area have already been presented. For example, Japanese laid-open patent application 61-12627 discloses a compound layer made of a hard carbon layer and a fluorine-containing lubrication layer formed using a sputtering process under a mixed atmosphere with an inert gas and a hydrocarbon gas, or a CVD process. Laid-open patent application 2-71422 discloses a film carbon layer, in which hydrogen bonds are found by Raman spectral analysis. In addition, laid-open patent application 2-29919 discloses a carbon layer, whose molecular structure is examined by Raman spectral analysis. Furthermore, laid-open patent application 2-87322 discloses a carbon film containing hydrogen and a magnetic recording medium coated with a lubricant, and laid-open patent application 1-258220 discloses that a diamond-like carbon film with a hydrogen content of $2–7\times 10^{22}$ atoms/cc has a hardness equivalent to that of a high-hardness slider, and also has an excellent anti-CSS characteristic as a high-hardness slider protecting layer. Moreover, laid-open patent application 2-282470 discloses that a carbon protective film formed using a sputtering process in a hydrocarbon gas environment has a similar degree of hardness as conventional graphite protective films, in which carbon is formed using a sputtering process in an atmosphere containing only argon, and that its surface is hydrophobic.

The inventors of the present invention have discussed each of the above proposals. However, none of the proposals have provided results that sufficiently satisfy the sliding characteristic requirement against hard sliders made of $Al_2O_3$. TiC or $CaTiO_3$. In carbon protective layers with the above structures, if a high-hardness layer with high diamond bonding, in which the diamond constitution has been increased, is formed, wear resistance against a high slider may be improved. However, if its hardness is too high, a problem is presented in that it can scratch the magnetic head, and its abrasive powder may further damage the magnetic head and the magnetic disk, thereby leading to increased wear. Conversely, if the hardness is too low, the layer will be worn out against the hard slider as it makes contact with the carbon layer. Thus, the above conventional technologies have not yet discovered film materials that possess excellent sliding characteristics and also have a low friction coefficient and wear resistance, and which, at the same time, exhibit optimal anti-CSS characteristics.

SUMMARY OF THE INVENTION

In the light of the above problems, the present invention is intended to realize a magnetic recording medium formed with a low-hardness protective layer that can be adapted to high-hardness slider materials while retaining the characteristics of a carbon protective layer.

The above problems have been solved by adapting the carbon protective layer to a high-hardness $Al_2O_3$. TiC or $CaTiO_3$ slider while retaining the property of a graphite-type carbon with a low friction coefficient, a carbon protective layer that has an increased high-hardness diamond-like property, which is one the properties of a carbon protective layer formed using a sputtering process, but at the same time, decreased hardness resulting from the introduction of a polymeric bond. That is, the magnetic recording medium that has at least a carbon protective layer to protect the magnetic layer laminated on a non-magnetic base substance according to the present invention is characterized in that it exhibits a polymeric bonding and a diamond bonding, the ratio of diamond bonding (taken with respect to all bonds present in the carbon layer) being higher than that of a graphite bonding, as shown by a Raman spectral analysis (excited by an argon-ion laser with a wavelength of 514.5 nm) of carbon, a principle component of the carbon protective layer. In this case, it is preferable that the ratio (B/A) of whole intensity B including the intensity of the peak fluorescence to substantial peak intensity A, excluding the intensity of peak fluorescence obtained in zones from 1545 $cm^{-1}$ to 1575 $cm^{-1}$ according to a Raman spectral analysis of the carbon protective layer, is 1.5 or higher, preferably, 2.0 or higher. In addition, it is desirable that the ratio (D/G) of peak intensity D in the 1545 to 1575 $cm^{-1}$ zones to peak intensity G in the 1340 to 1440 $cm^{-1}$ zones be within a range of 1.3 to 3.5 when the fluorescence spectrum is excluded from the Raman spectra obtained from the Raman spectral analysis of the carbon protective layer, and the Raman spectra are separated into two peaks using a gauss function. The carbon protective layer of such a magnetic recording medium has, at the same time, a micro hardness between 30 GPa and 50 GPa, while the specific resistance of its carbon protective layer is at least $10^7$ $\Omega cm$.

This magnetic recording medium is characterized in that the carbon protective layer has its principle component, carbon, mixed with at least a second component. If hydrogen is used as the second component, the addition thereof is preferably 30 to 50 at. %. In addition, it is preferable that the carbon protective layer has, in addition to its principle and second components, a third component, oxygen, added in an amount of, for example, about 7 at. % by atomic mass or less to a degree that will improve the sliding characteristics of the carbon protective layer. It is further preferable that the carbon protective layer has a thickness between 100 Å and 400 Å, and even more preferable, a lubrication layer formed with perfluoro polyether of a molecular weight between 2000 and 5000 as a main component disposed on the surface of the carbon protective layer, which can be expressed by the general expression:

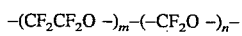

("m" and "n" in the formula are integers.)

In a magnetic recording medium manufacturing method which includes a protective-layer forming process to form a carbon protective layer on a magnetic layer laminated on a non-magnetic base substance by a sputtering process in a sputtering gas atmosphere containing mainly argon gas, the magnetic recording medium described above may be manufactured by a manufacturing method characterized in that the sputtering gas is a mixed gas containing methane at 10% to 35% by mol.

The carbon protective layer formed using this sputtering process is in a near amorphous state, and has microscopically a graphite bond and a diamond bond, but on the whole a mix of these bonds. Therefore, the microscopic hardness may be increased by raising the diamond bond ratio, and a carbon protective layer with low hardness on the whole may be formed by introducing a polymeric bond. If such a carbon protective layer is used, wear is less likely to occur even against a head that uses a high-hardness slider material, and at the same time, it will not be too hard, and the friction coefficient will be low. Therefore, in a CSS cycle as well, the friction coefficient changes only slightly. In addition, head crushing, which is caused by the head contacting the disk during a CSS operation wherein foreign materials or protrusions on the disk surface are present, can be prevented, which will allow a magnetic recording medium with high anti-CSS characteristics to be realized. As a result of analyzing the Raman spectra of the layer as parameters to indicate the film properties of the carbon protective layer exhibiting optimal anti-CSS characteristics, and upon calculating the ratio (B/A) of whole intensity B, including the intensity of the peak fluorescence, to substantial peak intensity A, excluding the intensity of the a peak fluorescence appearing in zones from 1545 $cm^{-1}$ to 1575 $cm^{-1}$, the film properties of the carbon protective layer can be improved if this fluorescence intensity is 1.5 or higher, or preferably 2.0 or higher because the polymeric bond in the carbon protective layer is measured as a fluorescence intensity. A carbon film with a peak value in the 1545 to 1575 $cm^{-1}$ zones, indicating that the diamond bond is largely protruding from the background due to the fluorescence, will have a small fluorescence intensity ratio that is less than 1.5, which means that the film will be too hard, and the head will be crushed. Thus no desirable anti-CSS characteristics can be obtained. Also in the case of a carbon protective layer, the peak intensity ratio of the graphite bond, which is shown by a peak value in the 1340 to 1440 $cm^{-1}$ zones, to a diamond bond, which is shown by a peak value in the 1545 to 1575 $cm^{-1}$ zones, can optimize the film properties of the carbon protective layer within a range of 1.3 to 3.5.

Several ways of forming such a carbon protective layer may be conceived, and among these some effective means include the addition of a second component to form the a nucleus of the diamond structure, that is, two face-centered cubic lattices biased by as much as ¼ to three-dimensional diagonal lines, and severing the double bond between carbon atoms forming the graphite structure, a laminar structure with six carbon rings. Therefore, adding methane or an equivalent gas with a regular tetrahedron structure will allow a carbon protective layer with high anti-CSS characteristic to be formed. To form such a protective layer, hydrogen is added as the second component, or otherwise, the double bond is severed by adding hydrogen. A diamond bonding and a polymeric bonding can also be introduced in this way and the result can be identified by the rise of the specific resistance of the carbon protective layer. Hydrogen or methane can be introduced by adding methane to the sputtering gas. Adding oxygen as a third component in addition to hydrogen, the second component in the carbon protective layer forming process, can form organic chemical groups created by bonding carbon with hydrogen, such as aldehyde group (—CHO) and carbonyl group (—CO), as a result of the severing of the double bond between the carbon atoms. Therefore, adding oxygen is an effective way of introducing a polymeric bond into the film property of the protective layer. Furthermore, by introducing this polymeric bond, the thickness of the film on the carbon protective layer can be reduced to as little as 100 Å to 400 Å while effective characteristics, such as the anti-CSS characteristics are maintained by the protective layer. Hence, an increase in the distance between the magnetic layer and the magnetic head resulting from the disposition of a protective layer can be avoided, thereby making a high-density recording onto a magnetic recording medium possible.

In a magnetic recording medium according to the present invention, by introducing thereon a polymeric bond with high diamond bonding ratio, it was found that a carbon protective layer with low hardness can be formed. Furthermore, it was found that a magnetic recording medium formed with such a carbon protective layer can be used for heads using high-hardness slider materials, such as $Al_2O_3$, TiC and $CaTiO_3$, while ensuring excellent wear resistance. Therefore, by using the magnetic recording medium according to the present invention and these heads, a magnetic recording device with high reliability, which is capable of making a high density recording, can be realized.

Furthermore, the present invention discloses a method for forming a carbon protective layer with a high diamond bonding ratio, and some polymeric bonding, by which a carbon protective layer with the desired hardness and specific resistance can be formed easily. Therefore, it is possible to manufacture a magnetic recording medium which is inexpensive, durable, and free of head crushes even if the head is made of high-hardness slider material.

BRIEF DESCRIPTION OF THE DRAWINGS

FIGS. 2(a)–(c) show Raman spectra in a carbon protective layer in three cases (cases 1 through 3), in which different amounts of methane are mixed.

FIGS. 3(a)–(c) show a CSS cycle and the change in the friction coefficient in three cases (cases 1 through 3), in which different amounts of methane are mixed.

DETAILED DESCRIPTION OF PREFERRED EMBODIMENTS

Hereunder, the various embodiments of the present invention are explained with reference to the appended drawings.

Figure 1:
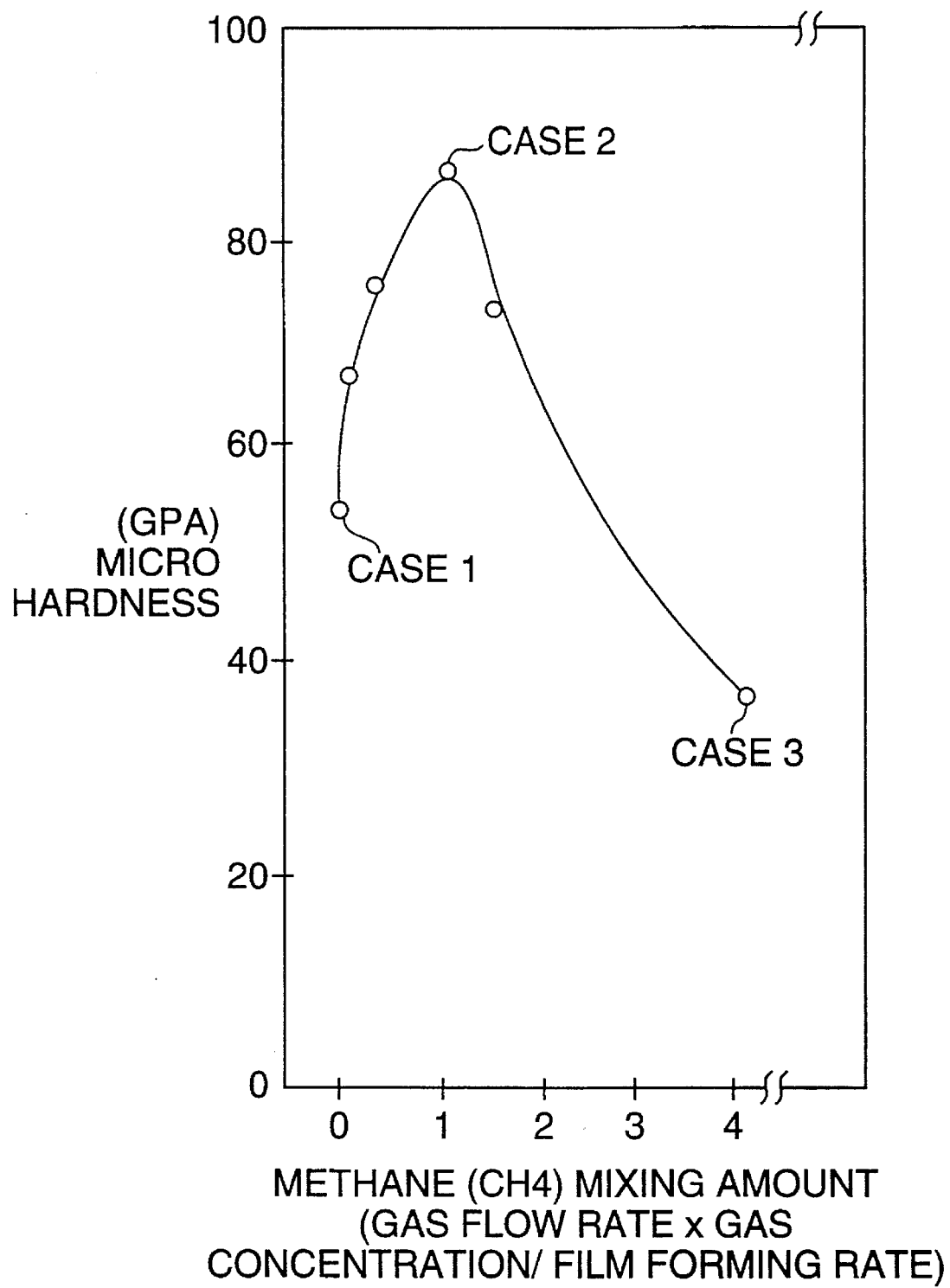
FIG. 1 is a graph showing the change in micro hardness in a carbon protective layer according to the amount of methane mixed into a sputtering gas.

FIG. 1 shows the relation between micro hardness showing the Vickers hardness of a carbon protective layer manufactured according to the present invention, and the amounts of methane gas mixed in during a sputtering process. A magnetic disk according to this example has the same configuration as the conventional magnetic disk described earlier using FIG. 9, and is manufactured using the same manufacturing method, except for the protective layer 4. Therefore, the explanations for common parts are omitted. A magnetic disk according to this example has a base substance 1 manufactured by applying Ni—P plating on a substrate 11 made of an Al—Mg alloy. Meanwhile, the base substance surface is tape-polished, and the metal base layer 2, the magnetic layer 3, and the protective layer 4 are formed using a sputtering process. In the magnetic disk according to this embodiment, the sputtering process is carried out by mixing the amount of methane shown in FIG. 1 into a sputtering gas consisting mainly of argon to form a carbon protective layer 4 to a thickness of about 225 Å to 300 Å. Although pressures between 5 m Torr and 10 m Torr are used for the sputtering gas, argon, it has been confirmed that only the amount of methane mixed in has any effect on any aspect of this embodiment.

As can be seen in FIG. 1, when the amount of methane mixed in is increased, the micro hardness increases, reaching a maximum value when the amount of methane mixed in is approximately one. If the amount of methane is increased further, the micro hardness decreases. The amount of methane mixed in (content) is shown using the following formula as a unit as shown in FIG. 1:

(Content)=[gas flow rate]×[gas concentration]/[film forming rate(1)

Of the magnetic disks manufactured in this way, those with methane amounts of 0, 1 and 4 were selected as cases 1, 2 and 3, and Raman spectrum analyses were conducted on the carbon protective layers of each disk. The results are shown in FIGS. 2(a)–(c). The SP3 shows the degree of diamond bonding, while the SP2 shows the degree of graphite bonding. When the value of the SP3 peak is almost the same as the value of the SP2 peak, or when the value of the SP2 peak is higher than the value of the SP3 peak, the carbon protective layer has a strong graphite characteristic (see FIG. 2a). On the other hand, the carbon protective layer in case 2, shown in FIG. 2(b), has the height of the SP3 that shifts according to degree of diamond bonding that is much higher than the SP2 that shifts according to the degree of graphite bonding, which signifies that the diamond bond ratio has been increased. This should have increased the micro hardness, as shown in FIG. 1. Furthermore, the Raman spectrum for the carbon protective layer in case 3, where the amount of methane is increased is shown in FIG. 2 (c). The SP3, that shifts according to degree of diamond bonding, is again much higher than the SP2, that shifts according to degree of graphite bonding which signifies that the diamond bond ratio is high. Furthermore, in case 3, the each peak has broadened, signifying-that random polymeric bonding has increased. Therefore, it can be assumed that high hardness has been obtained microscopically because the degree of diamond bonding has increased, although the micro hardness value obtained would be thought to have been decreased because of the polymeric bonding. In addition, the amount of decrease in the micro hardness is very large, making the micro hardness value lower than that in the case 1, where sputtering gas that only contains argon was used.

The magnetic disk formed with such a carbon protective layer has been repeatedly tested through CSS operations, and the results of such testing are shown in FIG. 3. In this test, CSS operations are repeated under a load of 10 gf using a thin-film head made of $Al_2O_3$. TiC, which must normally be sufficiently strong to withstand 25,000 to 30,000 repetitions. In the magnetic disk of case 1, which is shown in FIG. 3(a), and which is formed with a protective film with a higher graphite property, the friction coefficient increases sharply before it reaches 20,000 cycles. This, in turn, causes the head to be crushed. In the magnetic disk of case 2, which has a carbon protective layer with a higher diamond bond ratio, the increase in the friction coefficient is generally moderate, as shown in FIG. 3(b). However, the disk may be crushed easily because it is too hard. Even a disk that is not easily crushed will have an anti-CSS performance of only up to about 20,000 cycles. On the other hand, the magnetic disk of case 3, which has a carbon protective layer with polymeric bond, exhibits a gradual rise in the friction coefficient, and is free of crushing a head. Therefore, even after 40,000 CSS cycles no performance degradation is observed. At the same time, forming a carbon protective layer in a sputtering gas that contains more methane than case 3 would be impractical because it would make the sputtering process too difficult, and moreover, the hardness would be greatly decreased because of the increase of polymeric bonding ratio.

Figure 4:
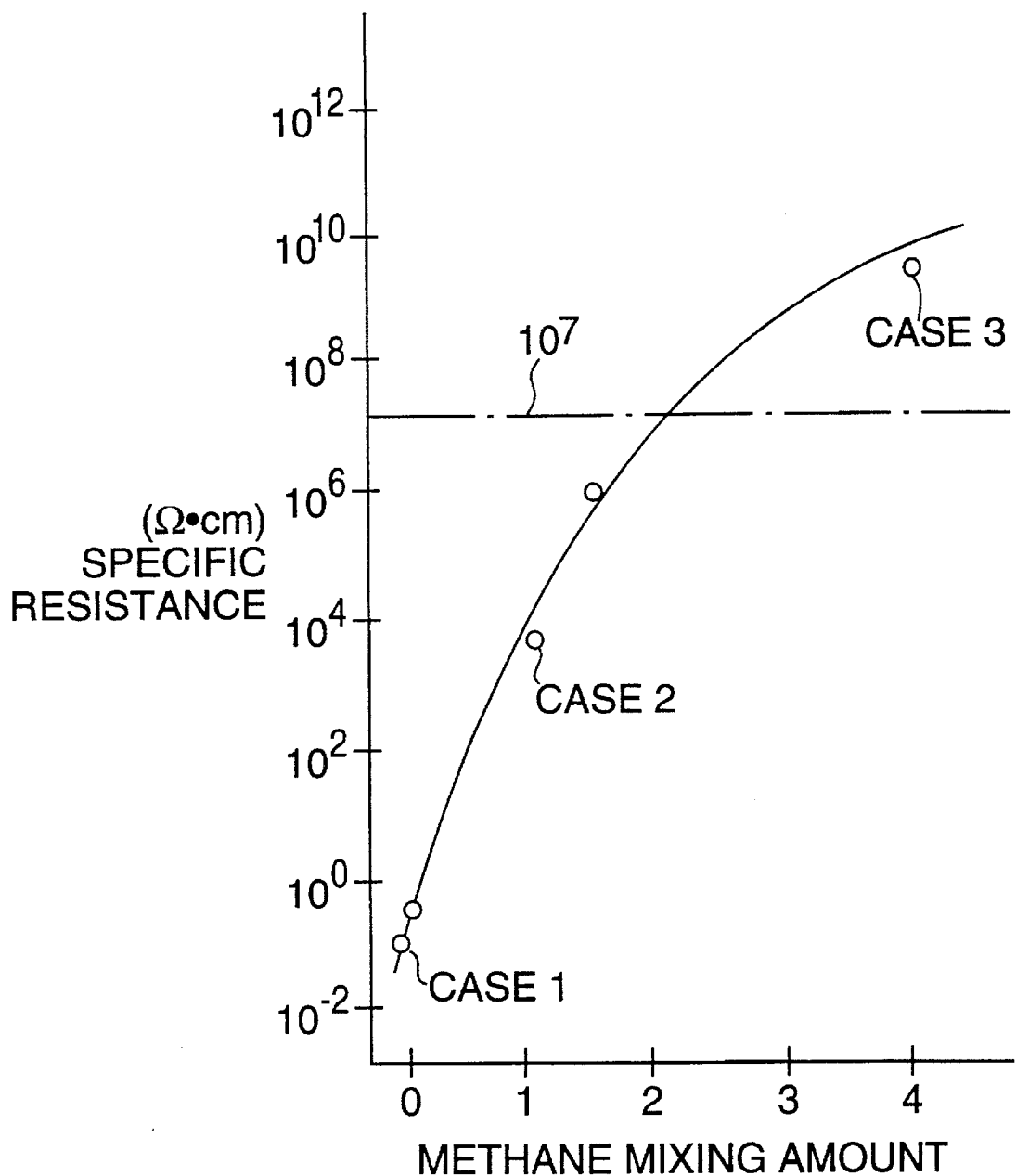
FIG. 4 is a graph showing the change in specific resistance in a carbon protective layer according to the amount of methane mixed into a sputtering gas.
Figure 5:
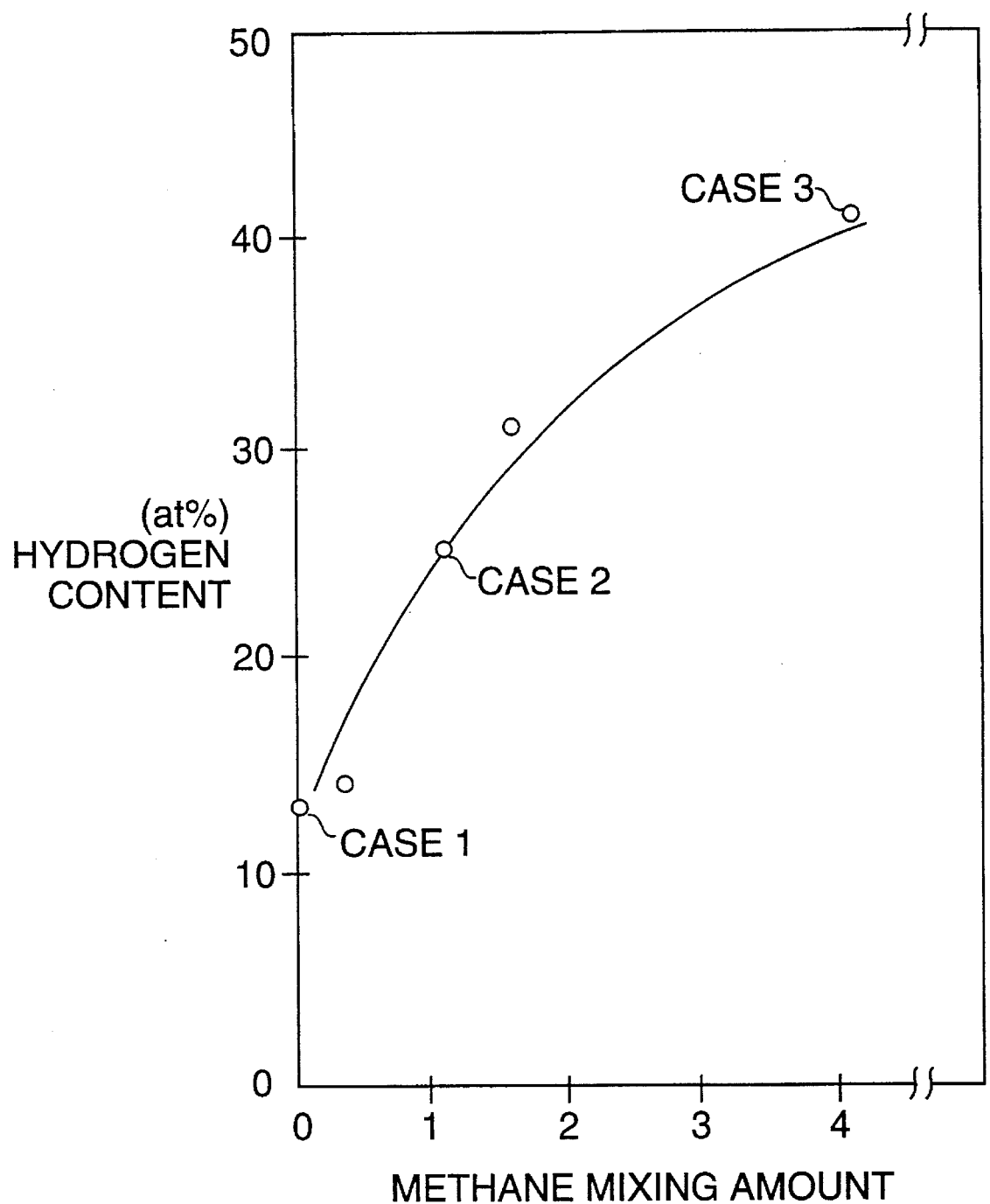
FIG. 5 is a graph showing the changes in the hydrogen content in a carbon protective layer when different amounts of methane are mixed into a sputtering gas.

In order to investigate the characteristics of the carbon protective layer, specific resistance and hydrogen content were also measured. The results are shown in FIGS. 4 and 5. Specific resistance increases as the amount of methane mixed in is increased, as shown in FIG. 4, and exceeds $10^7$ $\Omega$cm in case 3, where the endurance of the head during CSS operations is good. This increase is believed to be closely linked to the fact that the addition of methane and hydrogen (hydrogen promotes the creation of methane) severs dangling bonds and causes the specific resistance to increase. Also, the fact that adding more hydrogen increases polymeric bonding is linked to the above phenomena. FIG. 5 shows that the amount of hydrogen content increases as the methane increases. If the endurance of the head during CSS operation is good, as in case 3, the ratio of methane mixed with sputtering gas is about 1.5 to 5 (10% to 35% in mol concentration, preferably 20% to 35%, and more preferably about 30%). The hydrogen content corresponding to this amount is 30 to 50 at. % (the hydrogen content in case 3 is within this range).

As described above, a diamond bond can be created by forming a carbon protective layer by adding methane to the sputtering gas, and a polymeric bond can also be created by increasing the methane concentration. It has been disclosed in the present invention that a carbon protective layer with the above conditions will have decreased micro hardness, but the specific resistance and the hydrogen content increased, and show a very good anti-CSS characteristics in a CSS cycle test using high-hardness sliders. Therefore, by using the carbon protective layer as shown in this embodiment, a magnetic recording medium with a low friction coefficient and high durability can be realized even if a high-hardness slider made of $Al_2O_3$. TiC or the equivalent, which is required to raise the density, is used.

Figure 9:
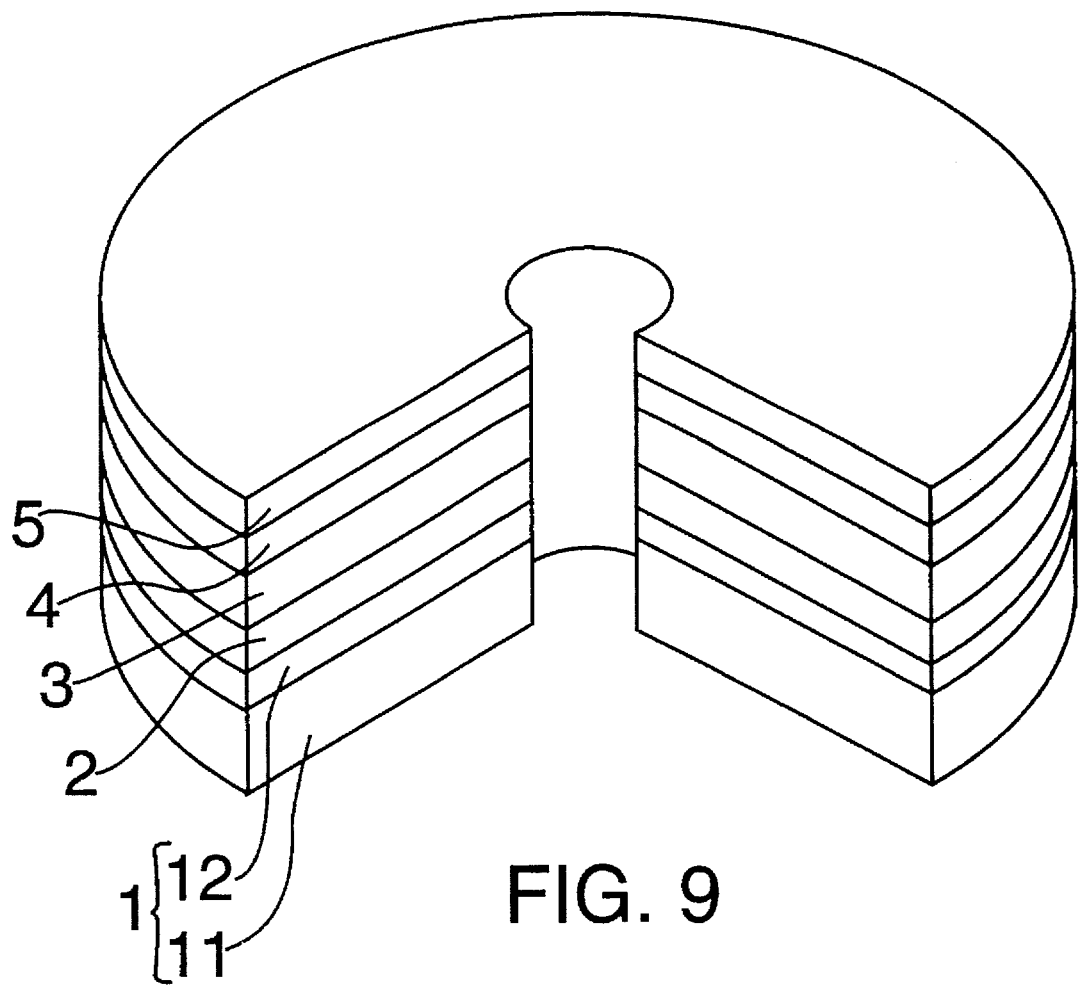
FIG. 9 is a descriptive drawing showing the configuration of a conventional magnetic recording medium.

A magnetic disk according to a second embodiment of the present invention has the same configuration as the conventional magnetic disk shown in FIG. 9, and is manufactured with the same manufacturing method, except for the protective layer 4. Therefore, explanations of common parts are omitted. The magnetic disk according to this example has an Ni—P plated layer 12 formed on the Al substrate 11, and this Ni—P plated layer is texture processed with an Ra (average roughness) of about 60 Å so that the base substance 1 can be manufactured. In the magnetic disk according to this embodiment, a carbon protective layer 4 is formed to a film thickness of 250 Å by a carrier-type DC magnetron sputter using carbon as a target, and using a mixed sputtering gas consisting mainly of argon and mixed with methane at a concentration of 30 mol%. Other film-forming conditions consist of an intra-chamber pressure at 10 m Torr, a mixed sputtering gas flow rate of 20 SCCM, a discharge power density of 1.2 W/cm$^2$, and a carrier velocity of 220 mm/min. On such a carbon protective layer 4, a lubrication layer 5 with a thickness of 20 Å to 23 Å is formed by coating with a perfluoropolyether-based lubricant, FOMBLIN AM 2001 made by AUSIMONT Corporation in Italy and diluted to 0.15% by weight using the ZS-100 solvent made by that company, with a dip method at a lifting speed of 1.0 mm/s. In this way the magnetic disk is completed. For the magnetic disk manufactured as described above, Table 1 summarizes the results of the evaluation of the carbon protective layer 4 and the CSS test on the magnetic disk as well as the results for other examples.

As a magnetic disk according to a third embodiment of the present invention, a magnetic disk was manufactured with the same configuration as the conventional magnetic disk shown in FIG. 9 and under the same conditions as the magnetic disk of the second embodiment, except that the mixed sputtering gas flow rate in the forming process of the carbon protective layer 4 was Table 1 shows 30 SCCM. The results of the evaluation of the carbon protective layer 4 of this magnetic disk, and the results of the CSS test on the magnetic disk.

As a magnetic disk according to a fourth embodiment of the present invention, a magnetic disk was manufactured with the same configuration as the conventional magnetic disk shown in FIG. 9, with a carbon protective layer 4 manufactured by a DC plasma CVD process under a substrate temperature of 50° C. using ethanol as a gas source, in an intra-chamber pressure of 0.2 m Torr, and with a discharge power of 700 W, with all other conditions being the same as for the magnetic disk of the second embodiment. Table 1 shows the results of the evaluation on the carbon protective layer 4 of this magnetic disk and results of the CSS test on the magnetic disk.

FIRST COMPARATIVE EXAMPLE

A magnetic disk according to a first comparative example was manufactured with a carbon protective layer 4 created by using the sputtering gas used in a DC magnetron sputter for the protective layer forming process as an inert sputtering gas consisting mainly of argon and a discharge power of 1.0 W/cm$^2$, with other conditions being the same as for the magnetic disk of the second embodiment. Table 1 shows the results of the evaluation of the carbon protective layer 4 of this magnetic disk and of the CSS test on the magnetic disk.

SECOND COMPARATIVE EXAMPLE

A magnetic disk according to a second comparative example was manufactured under the same conditions as the magnetic disk of the second embodiment, except that the mixed sputtering gas flow rate in the forming process of the carbon protective layer 4 was 5 SCCM. Table 1 shows the results of the evaluation of the carbon protective layer 4 of this magnetic disk and of the CSS test on the magnetic disk.

THIRD COMPARATIVE EXAMPLE

A magnetic disk according to a third comparative example was manufactured under the same conditions as the magnetic disk in the second embodiment, except that the mixed sputtering gas flow rate in the forming process of the carbon protective layer 4 was 10 SCCM. Table 1 shows the results of the evaluation of the carbon protective layer 4 of this magnetic disk and of the CSS test on the magnetic disk.

FOURTH COMPARATIVE EXAMPLE

A magnetic disk manufactured under exactly the same conditions as the magnetic disk in the second embodiment until the formation of the carbon protective layer 4, but without a lubrication layer 5 on the carbon protective layer 4, was prepared as a fourth comparative example. Table 1 shows the results of the evaluation of the carbon protective layer 4 of this magnetic disk and of the CSS test on the magnetic disk.

Table 1

1. Film-forming method
2. Raman D peak position ($cm^{-1}$)
3. Raman fluorescence intensity ratio (B/A)
4. Raman peak intensity ratio (D/G)
5. Hardness (GPa)
6. Hydrogen concentration of the film (at.%)
7. Oxygen concentration of the film (at.%)
8. CSS evaluation (friction coefficient after 20K cycles)
9. Second embodiment
10. Sputter Ar+30% $CH_4$ 20SCCM
11. Third embodiment
12. Sputter Ar+30%$CH_4$ 30SCCM
13. Fourth embodiment
14. Plasma CVD ethanol
15. First comparative example
16. Sputter Argon only at 20 SCCM
17. Second comparative example
18. Sputter Ar+30%$CH_4$ 5SCCM19. Third comparative example
20. Sputter Ar+30%$CH_4$ 10SCCM
21. Fourth comparative example without a lubrication layer
22. Sputter Ar+30%$CH_4$ 20SCCM
23. Crush
24. Crush Table 1 shows the fluorescence intensity ratio of the Raman spectra in the carbon protective layer, and the peak intensity ratio measured using an argon-ion laser with a wavelength of 514.5 nm on the magnetic disks of the above embodiments 2 through 4 and comparative examples 1 through 4. The fluorescence intensity ratio

TABLE 1

| No. | 成膜法 | ラマン D ピーク 位置 ($cm^{-1}$) | ラマン 蛍光 強度比 (B/A) | ラマン ピーク 強度比 (D/G) | 硬度 (GPa) | 膜中 水素 濃度 (at. %) | 膜中 酸素 濃度 (at. %) | 評価 (20 k 回後 の摩擦 係数) |
|---|---|---|---|---|---|---|---|---|
| 第 2 実施例 | スパッタ Ar + 30% $CH_4$ 20 SCCM | 1562 | 3.02 | 2.25 | 37 | 38 | 5 | ○ (0.35) |
| 第 3 実施例 | スパッタ Ar + 30% $CH_4$ 30 SCCM | 1570 | 6.50 | 2.86 | 30 | 42 | 5 | ○ (0.38) |
| 第 4 実施例 | プラズマ ethanol | 1556 | 2.17 | 1.43 | 38 | 37 | 3 | ○ (0.43) |
| 第 1 比較例 | スパッタ Ar のみ 20 SCCM | 1578 | 1.19 | 3.86 | 54 | 12 | 6 | × (0.80) |
| 第 2 比較例 | スパッタ Ar + 30% $CH_4$ 5 SCCM | 1557 | 1.24 | 1.77 | 87 | 24 | 0 | クラッシュ |
| 第 3 比較例 | スパッタ Ar + 30% $CH_4$ 10 SCCM | 1551 | 1.38 | 1.25 | 69 | 32 | 0 | △ (0.65) |
| 第 4 比較例 潤滑層なし | スパッタ Ar + 30% $CH_4$ 20 SCCM | 1562 | 3.02 | 2.25 | 37 | 38 | 5 | × クラッシュ |

Figure 6A:
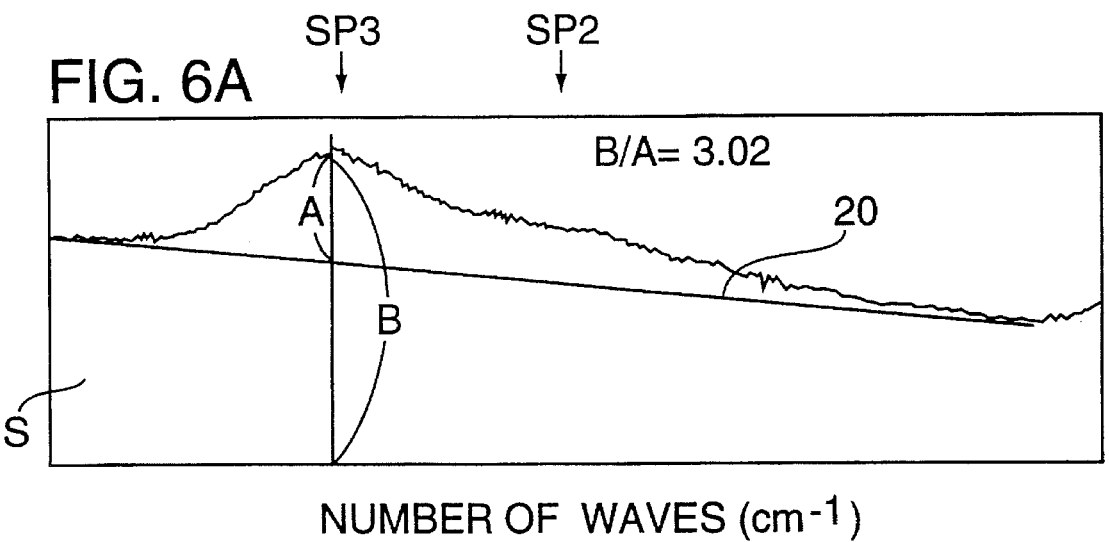
FIG. 6(a) is a waveform chart showing Raman shift that includes the fluorescence spectrum in a carbon protective layer on a magnetic disk according to the second embodiment of the present invention.
Figure 6B:
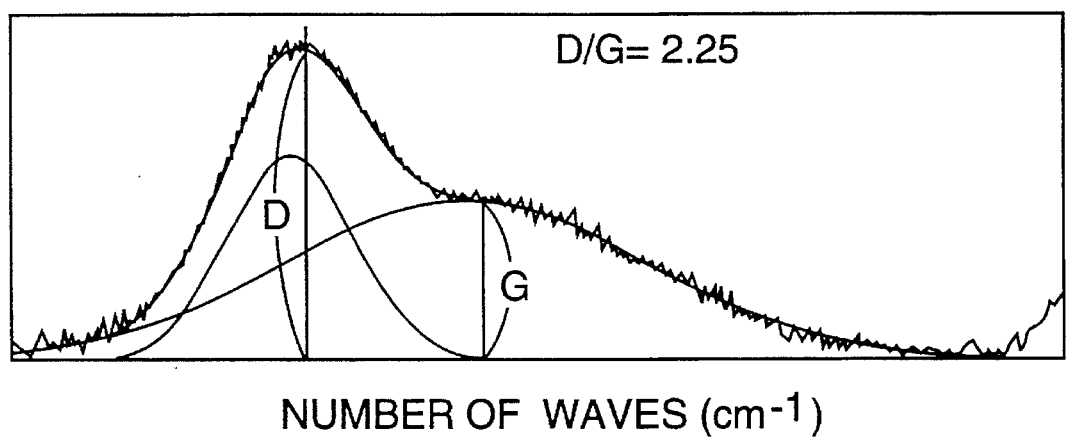
FIG. 6(b) is a waveform chart showing a Raman shift that excludes the fluorescence spectrum from the Raman spectra shown in FIG. 6(a).

| No. | Film-Forming Method | Raman D peak position (cm$^{-1}$) | Raman flourescence intensity ratio (B/A) | Raman peak intensity ratio (D/G) | Hardness (GPa) | Hydrogen concentration of the film (at. %) | Oxygen concentration of the film (at. %) | CSS evaluation (friction coefficient after 20K cycles) |
|---|---|---|---|---|---|---|---|---|
| Second Embodiment | Sputter Ar + 30% CH$_4$ 20 SCCM | 1562 | 3.02 | 2.25 | 37 | 38 | 5 | o (0.35) |
| Third Embodiment | Sputter Ar + 30% CH$_4$ 30 SCCM | 1570 | 6.50 | 2.86 | 30 | 42 | 5 | o (0.38) |
| Fourth Embodiment | Plasma CVD ethanol | 1556 | 2.17 | 1.43 | 38 | 37 | 3 | o (0.43) |
| First Comparative Example | Sputter Argon only at 20 SCCM | 1578 | 1.19 | 3.86 | 54 | 12 | 6 | x (0.80) |
| Second Comparative Example | Sputter Ar + 30% CH$_4$ 5 SCCM | 1557 | 1.24 | 1.77 | 67 | 24 | 0 | x Crush |
| Third Comparative Example | Sputter Ar + 30% CH$_4$ 10 SCCM | 1551 | 1.38 | 1.25 | 69 | 32 | 0 | Δ (0.65) |
| Fourth Comparative Example without a lubrication layer | Sputter Ar + 30% CH$_4$ 20 SCCM | 1562 | 3.02 | 2.25 | 37 | 38 | 5 | x Crush | and the peak intensity ratio are explained hereunder with reference to FIGS. 6(a) and (b). FIG. 6(a) is Raman spectra in the carbon protective layer of the magnetic disk according to the second embodiment, wherein the Raman spectra in the carbon protective layer has the SP2 peak showing a graphite bond in the vicinity of 1350 cm$^{-1}$ and the SP3 peak showing a diamond bond in the vicinity of 1560 cm$^{-1}$ (1562 cm$^{-1}$), and a region (S) below a straight line linking both sides of a skirt of the SP3 peak, while the main peak is the fluorescence zone of the Raman spectra. Therefore, the fluorescence intensity ratio in the carbon protective layer of the second embodiment is represented by a ratio (B/A) of the whole peak intensity (B) including that in the fluorescence portion to the substantial intensity (A) excluding the fluorescence portion in the SP3 peak, which is 3.02. Incidentally, the background (the region S) in the Raman spectra shown as the fluorescence portion in FIG. 6(a) reveals a polymeric bond in the carbon protective layer, illustrating that the carbon protective layer of the second embodiment has sufficient polymeric bonding in addition to a diamond bond at a high degree of diamond bonding. FIG. 6(b) is a waveform chart that results when the background (the regions) produced by fluorescence from the Raman spectra shown in FIG. 6(a) is excluded using the linear approximation method and then separated into two peaks, SP2 and SP3, using the Gaussian function. In FIG. 6(b), the carbon protective layer of the second embodiment has the SP3 peak showing a diamond bond much higher than the SP2 peak showing a graphite bond. This indicates that the diamond bond ratio has increased. From this figure, the peak intensity ratio in the carbon protective layer of the second embodiment is 2.25 according to the ratio (D/G) of the SP3 peak intensity (D) to the SP2 peak intensity (G).

The fluorescence intensity ratio and the peak intensity ratio on each magnetic disk are shown in Table 1. While the fluorescence intensity ratios in the magnetic disks of embodiments 2 through 4 and the fourth comparative example are as high as between 2.17 and 6.50, the fluorescence intensity ratios in the magnetic disks of comparative examples 1 through 3 are as low as between 1.19 and 1.38. This fluorescence intensity represents the ratio of intensity in the diamond bond to intensity in the polymeric bond of the carbon protective layer. Moreover, this intensity functions as an index for the carbon protective layer high in the microscopic hardness, but low on the whole has been achieved. Therefore, it can be seen that, while the micro hardness in the magnetic disks in the comparative examples 1 through 3 is as high as 54 GPa to 87 GPa, the micro hardness in the magnetic disks in the embodiments 2 through 4 and the fourth comparative example is as low as between 30 and 38 GPa, which means that there is a large degree of polymeric bonding. The properties of the magnetic disks of embodiments 2 through 4 and the fourth comparative example are determined by the hydrogen content and the oxygen content contained in the films on the carbon protective layers. That is, in embodiments 2 through 4 and the fourth comparative example, the total hydrogen concentrations and the total oxygen concentrations in the films on the carbon protective layers remain at almost constant level, that is 37 to 42 at. % for hydrogen and 3 to 5 at. % for oxygen. On the other hand, the total hydrogen concentrations in the films on the carbon protective layers in the comparative examples 1 through 3 do not remain constant and vary from 12 to 32 at. %, while the total oxygen concentrations vary between 0 at. % and 6 at. %.

Hydrogen and oxygen contained in the film on the carbon protective layer would sever a dual bond of carbon, which is the main component of the carbon protective layer, increase its diamond-like property, and introduce a polymeric bond. Incidentally, the oxygen taken into the film on the carbon protective layer is oxygen separated from moisture in a chamber in which the carbon protective layer is formed. Therefore, the magnetic disks in the embodiments 2 through 4, which have an adequate amount of hydrogen and oxygen in the carbon protective layer and which have sufficient hardness due to their microscopic diamond structure, still have softness due to the introduced polymeric bond on the whole as the film properties of the carbon protective layer. Moreover, these magnetic disks don't wear down easily even against a hard slider made of Al$_2$O$_3$. TiC and the like, and at the same time, they have a property being too hard removed, and their friction coefficients are low. Therefore, the friction coefficients of the magnetic disks in embodiments 2 through 4 vary less even in a CSS cycle, and are assumed to be capable of improving the anti-CSS durability. These facts are supported by the results of the CSS repetition tests carried out on each magnetic disk in embodiments 2 through 4 and comparative examples 1 through 4 shown in Table 1.

Figure 7:
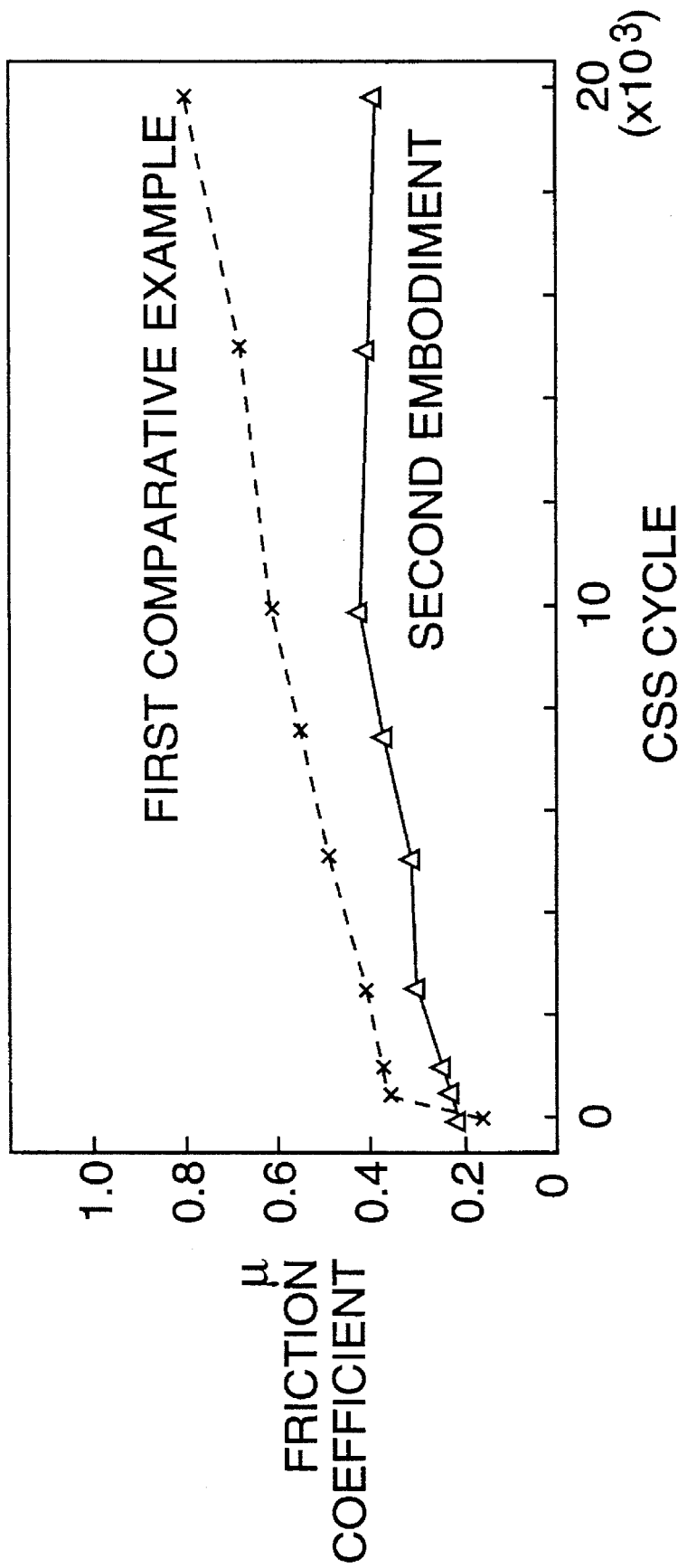
FIG. 7 is a graph showing a CSS cycle and the change in friction coefficient in two cases (the second embodiment and the first comparative example), in which different amounts of methane are mixed.

FIG. 7 is a graph showing changes in the friction coefficients of the magnetic disks in the second embodiment and the first comparative example as a result of the CSS repetition test. This test repeats CSS operations under a load of 9.5 gf using a thin-film head made of $Al_2O_3$. TiC. As can be seen in Table 1, in the magnetic disks of embodiments 2 through 4, the friction coefficients when the CSS repetition exceeded 20,000 cycles are as low as 0.35 (in the second embodiment), 0.38 (in the third embodiment), and 0.43 (in the fourth embodiment), indicating that the friction coefficients vary little even the CSS operation is repeated. On the other hand, in the magnetic disks of the first and third comparative examples, the friction coefficients increase as the CSS operation is repeated, and when the CSS repetition exceeded 20,000 cycles the friction coefficients are as high as 0.80 (in the first comparative example), and 0.65 (in the third comparative example), and despite the fact that the micro hardness of the carbon protective layer is considerably higher than that of the magnetic disks in embodiments 2 through 4, damage was found on the surface of the magnetic disks as a result of the sliding of the $Al_2O_3$. TiC slider. Furthermore, the magnetic disk in the second comparative example suffered a head crush at about 1,000 CSS repetitions because its micro hardness was too high at 87 GPa. Moreover, in the magnetic disk in the fourth comparative example, the film property of the carbon protective layer was evaluated as satisfactorily as the carbon protective layers of embodiments 2 through 4; however, the carbon protective layer was worn out as a result of CSS repetition because it had no lubrication layer, and this led to crush a head.

Figure 8:
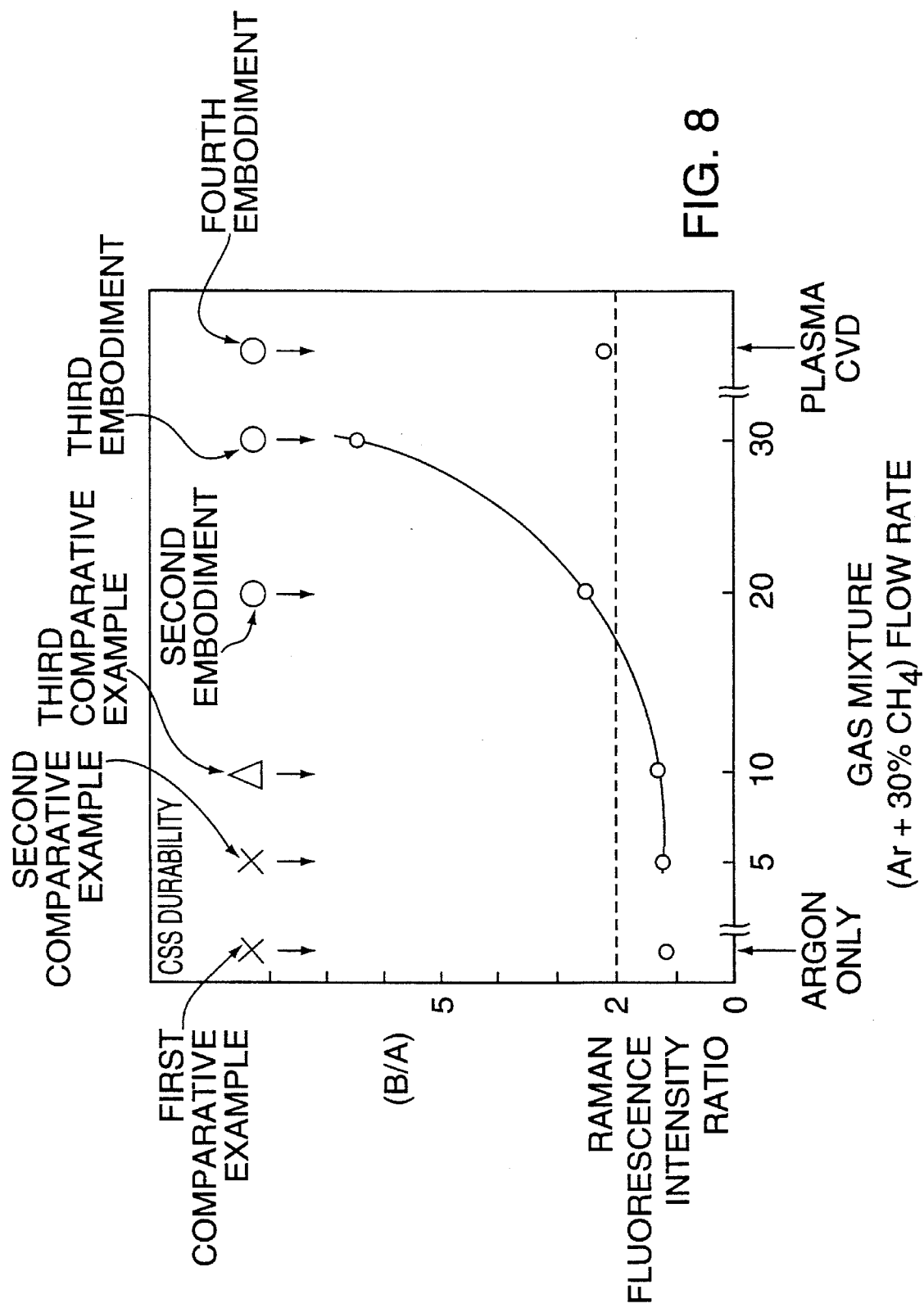
FIG. 8 is the graph showing a fluorescence intensity ratio in the Raman spectra in the magnetic disks according to embodiments No. 2 through No. 4 and comparative examples No. 1 through No. 3, and correspondence with the CSS cycle.

FIG. 8 is a graph showing the relative fluorescence intensity ratio (B/A) in the Raman spectra of the magnetic disks according to embodiments 2 through 4 and comparative examples 1 through 3 with the CSS cycles. In this graph, CSS durability corresponds to the fluorescence intensity ratio, with magnetic disks that have a fluorescence intensity ratio of more than 2 in embodiments 2 through 4 showing good CSS durability. In addition, it can be understood that, from the second and third embodiments and the second and third comparative examples in which the carbon protective layers are formed using argon-methane mixed sputtering gas, the fluorescence intensity ratio has been determined by the flow rates of the mixed sputtering gas during the carbon protective-layer forming process. To explain, it is believed that the fluorescence intensity ratio increases as the flow rate of the mixed sputtering gas increases, and the methane amount increases because of the large amount of mixed sputtering gas. Hence hydrogen in methane and oxygen in moisture in the chamber may be taken in more easily during the carbon protective-layer forming process.

As has been described, in the second through fourth embodiments, by introducing hydrogen and oxygen into the film on the carbon protective layer, a protective layer with high microscopic hardness, but low hardness on the whole can be realized. Therefore, in a magnetic disk using such a carbon protective layer, the friction coefficient is reduced against a hard head made of $Al_2O_3$. TiC or $CaTiO_3$, the wear resistance is improved, head damage is kept to a minimum, and the CSS durability can be greatly improved, which makes it possible to realize a high-reliability magnetic disk.

What is claimed is:

1. A magnetic recording medium comprising:

a non-magnetic base substance;

a magnetic layer laminated on said non-magnetic base substance;

a carbon protective layer formed on said magnetic layer, the carbon protective layer comprising carbon as a main component, the carbon further comprising diamond bonding, polymeric bonding and graphite bonding, wherein the ratio of diamond bonds to all bonds present in the carbon is higher than the ratio of graphite bonds to all bonds present in the carbon;

a Raman fluorescence intensity ratio (B/A) is not less than 1.5, wherein (B) represents whole peak intensity including the fluorescence intensity and (A) represents substantial peak intensity excluding fluorescence intensity from said (B), wherein said (A) and (B) are obtained from a region ranging from 1545 $cm^{-1}$ to 1575 $cm^{-1}$, which indicates diamond bond;

a Raman peak intensity ratio (D/G) is within a range of 1.3 to 3.5, wherein (D) represents the peak intensity obtained in a region ranging from 1545 $cm^{-1}$ to 1575 $cm^{-1}$ which indicates diamond bond, and (G) represents the peak intensity obtained in a region ranging from 1340 $cm^{-1}$ to 1440 $cm^{-1}$, which indicates graphite bond, wherein said each peak intensity, (D) and (G), obtained as a result of excluding the background from said Raman Spectrum and dividing into two peaks using a Gaussian function;

said carbon protective layer further comprises a secondary component which is mixed with said carbon; and, wherein said secondary component is hydrogen and is present in an amount ranging from about 30 to 50 at. %.

2. The magnetic recording medium of claim 1, wherein said carbon protective layer further comprises hydrogen and oxygen as secondary and ternary components, respectively, wherein oxygen is present in an amount of not greater than 7 at. %.

3. A magnetic recording of claim 1, wherein said carbon protective layer has a thickness within a range of 100 Å to 400 Å.

4. The magnetic recording medium, according to claim 1, wherein said carbon protective layer has a micro-hardness within a range of from about 30 GPa to about 50 GPa.

5. The magnetic recording medium, according to claim 1 wherein said carbon layer has a specific resistance not less than $10^7$ $\Omega$m.

6. The magnetic recording medium of claim 1, further comprising a lubrication layer formed on said carbon protective layer, said lubrication layer comprising, as a main component, a polyfluoro polyether, expressed as the following formula:

$$—(CF_2CF_2O—)_m—(—CF_2O—)_n—,$$

wherein "m" and "n" are integers.

7. A carbon protective layer for a magnetic recording medium, comprising:

carbon, as a primary component;

hydrogen and oxygen as secondary and ternary components, respectively, wherein oxygen is present in an amount of not greater than 7 at. %;

a Raman fluorescence intensity ratio (B/A) is not less than 1.5, wherein (B) represents whole peak intensity including the fluorescence intensity and (A) represents substantial peak intensity excluding fluorescence intensity from said (B), wherein said (A) and (B) are obtained from a region ranging from 1545 cm$^{-1}$ to 1575 cm$^{-1}$, which indicates diamond bond; and said carbon layer further comprising diamond bonding, polymeric bonding and graphite bonding, wherein a ratio of diamond bonds to all bonds present in said carbon is higher than a ratio of graphite bonds to all bonds present in said carbon.

wherein said secondary component is hydrogen and is present in an amount ranging from about 30 to 50 at. %.

8. A method for producing a magnetic recording medium, comprising the steps of:

forming a non-magnetic base substance;

laminating a magnetic layer on said non-magnetic base substance;

forming a carbon protective layer on said magnetic layer, wherein the carbon protective layer is formed by sputtering in an atmosphere of sputtering gas consisting essentially of a gas from the group consisting of argon, methane and argon gas mixed with methane in an amount of 10% to 35% by mol;

the carbon protective layer comprising carbon as a main component, the carbon further comprising diamond bonding, polymeric bonding and graphite bonding, wherein the ratio of diamond bonds to all bonds present in the carbon is higher than the ratio of graphite bonds to all bonds present in the carbon;

a Raman fluorescence intensity ratio (B/A) is not less than 1.5, wherein (B) represents whole peak intensity including the fluorescence intensity and (A) represents substantial peak intensity excluding fluorescence intensity from said (B), wherein said (A) and (B) are obtained from a region ranging from 1545 cm$^{-1}$ to 1575 cm$^{-1}$, which indicates diamond bond;

a Raman peak intensity ratio (D/G) is within a range of 1.3 to 3.5, wherein (D) represents the peak intensity obtained in a region ranging from 1545 cm$^{-1}$ to 1575 cm$^{-1}$, which indicates diamond bond, and (G) represents the peak intensity obtained in a region ranging from 1340 cm$^{-1}$ to 1440 cm$^{-1}$, which indicates graphite bond, wherein said each peak intensity, (D) and (G), obtained as a result of excluding the background from said Raman Spectrum and dividing into two peaks using a Gaussian function;

said carbon protective layer further comprises a secondary component which is mixed with said carbon; and, wherein said secondary component is hydrogen and is present in an amount ranging from about 30 to 50 at. %.

\* \* \* \* \*